United States Patent
Christie et al.

(10) Patent No.: US 8,795,417 B2
(45) Date of Patent: Aug. 5, 2014

(54) COMPOSITE OXYGEN TRANSPORT MEMBRANE

(71) Applicant: Praxair Technology, Inc., Danbury, CT (US)

(72) Inventors: Gervase Maxwell Christie, Buffalo, NY (US); Jonathan A. Lane, Amherst, NY (US)

(73) Assignee: Praxair Technology, Inc., Danbury, CT (US)

(*) Notice: Subject to any disclaimer, the term of this patent is extended or adjusted under 35 U.S.C. 154(b) by 153 days.

(21) Appl. No.: 13/644,666

(22) Filed: Oct. 4, 2012

(65) Prior Publication Data

US 2013/0156978 A1  Jun. 20, 2013

Related U.S. Application Data

(60) Provisional application No. 61/576,108, filed on Dec. 15, 2011.

(51) Int. Cl.
*B01D 53/22* (2006.01)

(52) U.S. Cl.
USPC ............... 96/11; 95/45; 95/54; 95/43; 96/7; 96/9

(58) Field of Classification Search
CPC ..... B01D 53/228; B01D 71/022; C01B 3/505
USPC ............... 95/43, 45, 54; 96/7, 9, 11
See application file for complete search history.

(56) References Cited

U.S. PATENT DOCUMENTS

| | | | | |
|---|---|---|---|---|
| 2,593,507 | A * | 4/1952 | Wainer | 264/44 |
| 5,820,654 | A * | 10/1998 | Gottzman et al. | 95/54 |
| 6,153,163 | A * | 11/2000 | Prasad et al. | 423/246 |
| 6,402,988 | B1 * | 6/2002 | Gottzmann et al. | 252/373 |
| 6,537,514 | B1 * | 3/2003 | Prasad et al. | 423/437.1 |
| 6,638,575 | B1 * | 10/2003 | Chen et al. | 427/453 |
| 6,786,952 | B1 * | 9/2004 | Risdal et al. | 95/54 |
| 7,125,528 | B2 * | 10/2006 | Besecker et al. | 422/211 |

(Continued)

OTHER PUBLICATIONS

Furusaki et al. "Perovskite-type lanthanum chromium-based oxide films prepared by ultrasonic spray pyrolysis" Journal of Materials Science 30 (1995) 2829-2834.*

(Continued)

*Primary Examiner* — Jason M Greene
*Assistant Examiner* — Anthony Shumate
(74) *Attorney, Agent, or Firm* — Robert J. Hampsch

(57) ABSTRACT

A method of producing a composite oxygen ion membrane and a composite oxygen ion membrane in which a porous fuel oxidation layer and a dense separation layer and optionally, a porous surface exchange layer are formed on a porous support from mixtures of $(Ln_{1-x}A_x)_wCr_{1-y}B_yO_{3-\delta}$ and a doped zirconia. In the porous fuel oxidation layer and the optional porous surface exchange layer, A is Calcium and in the dense separation layer A is not Calcium and, preferably is Strontium. Preferred materials are $(La_{0.8}Ca_{0.2})_{0.95}Cr_{0.5}Mn_{0.5}O_{3-\delta}$ for the porous fuel oxidation and optional porous surface exchange layers and $(La_{0.8}Sr_{0.2})_{0.95}Cr_{0.5}Fe_{0.5}O_{3-\delta}$ for the dense separation layer. The use of such materials allows the membrane to sintered in air and without the use of pore formers to reduce membrane manufacturing costs. The use of materials, as described herein, for forming the porous layers have application for forming any type of porous structure, such as a catalyst support.

19 Claims, 1 Drawing Sheet

(56) References Cited

U.S. PATENT DOCUMENTS

| | | |
|---|---|---|
| 7,556,676 B2 | 7/2009 | Nagabhushana et al. |
| 8,128,988 B2 * | 3/2012 | Yasumoto et al. ............ 427/100 |
| 8,658,328 B2 * | 2/2014 | Suda et al. .................... 429/469 |
| 2002/0078906 A1 * | 6/2002 | Prasad et al. .................... 122/40 |
| 2004/0089973 A1 * | 5/2004 | Hoang ..................... 264/211.21 |
| 2006/0127749 A1 * | 6/2006 | Christie et al. ............... 429/121 |
| 2007/0082254 A1 | 4/2007 | Hiwatashi |
| 2007/0104793 A1 * | 5/2007 | Akash .......................... 424/489 |
| 2008/0168901 A1 * | 7/2008 | Carolan et al. .................... 96/11 |
| 2009/0023050 A1 * | 1/2009 | Finnerty et al. ................ 429/44 |
| 2009/0029040 A1 * | 1/2009 | Christie et al. ............. 427/126.4 |
| 2011/0111320 A1 * | 5/2011 | Suda et al. .................... 429/465 |
| 2011/0253551 A1 * | 10/2011 | Lane et al. .................... 205/555 |
| 2013/0072375 A1 * | 3/2013 | Lane et al. ........................ 502/1 |
| 2014/0044604 A1 * | 2/2014 | Lane et al. ............... 422/186.04 |
| 2014/0056774 A1 * | 2/2014 | Kelly et al. .................... 422/162 |
| 2014/0060643 A1 * | 3/2014 | Martin et al. ................. 136/256 |

OTHER PUBLICATIONS

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768, ISSN: 0167-2738.

* cited by examiner

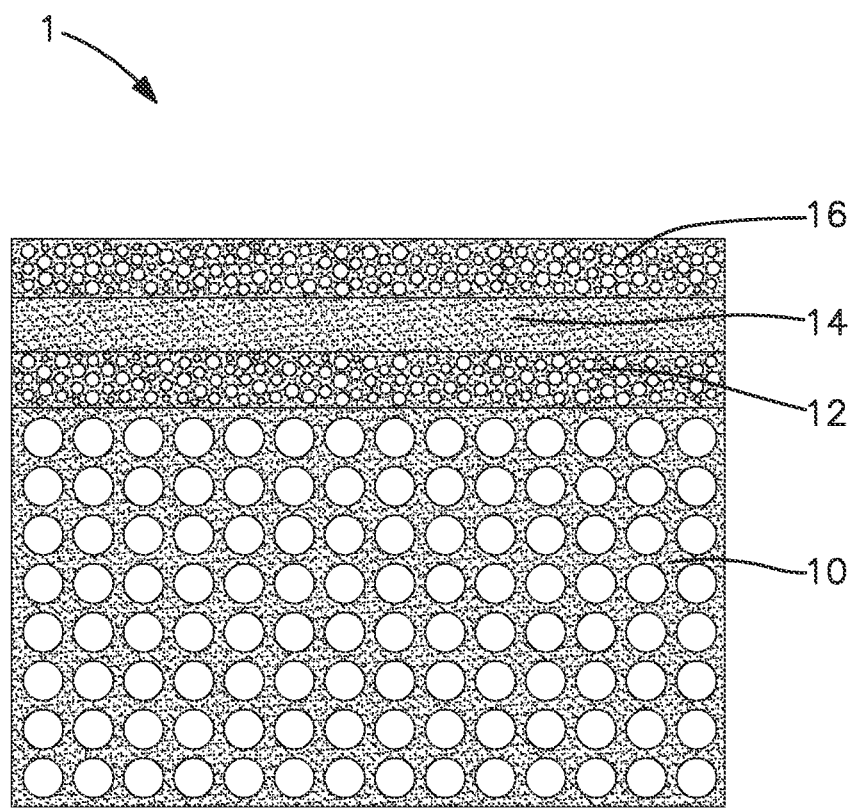

COMPOSITE OXYGEN TRANSPORT MEMBRANE

CROSS REFERENCE TO RELATED APPLICATIONS

The present application claims priority to and the benefit of U.S. provisional patent application Ser. No. 61/576,108 filed Dec. 15, 2011.

This invention was made with Government support under Cooperative Agreement No. DE-FC26-07NT43088, awarded by the United States Department of Energy. The Government has certain rights in this invention.

FIELD OF THE INVENTION

The present invention relates to a method of forming a composite oxygen transport membrane and the composite oxygen transport membrane itself in which a porous fuel oxidation layer and a dense separation layer and optionally, a porous surface activation layer are formed on a porous support from mixtures of $(Ln_{1-x}A_x)_wCr_{1-y}B_yO_{3-\delta}$ and a doped zirconia. More particularly, the present invention relates to such a method in which the porous fuel oxidation layer and the optional porous surface exchange layer are formed $(La_{1-x}Ca_x)_wCr_{1-y}Mn_yO_{3-\delta}$ and the doped zirconia, the dense separation layer is formed from $(La_{1-x}Sr_x)_wCr_{1-y}Fe_yO_{3-\delta}$ and the doped zirconia and all of such layers are sintered in air without the use of pore formers in either of the porous layers.

BACKGROUND

Oxygen transport membranes function to separate oxygen from air or other oxygen containing gases by transporting oxygen ions through a material that is capable of conducting oxygen ions and electrons at elevated temperatures. When a partial pressure difference of oxygen is applied on opposite sides of such a membrane, oxygen ions will ionize on one surface of the membrane and emerge on the opposite side of the membrane and recombine into elemental oxygen. The free electrons resulting from the combination will be transported back through the membrane to ionize the oxygen. The partial pressure difference can be produced by providing the oxygen containing feed to the membrane at a positive pressure or by combusting a fuel or other combustible substance in the presence of the separated oxygen on the opposite side of the membrane or a combination of the two methods. It is to be noted that the combustion will produce heat that is used to raise the temperature of the membrane to an operational temperature at which the oxygen ion transport can occur and also, to supply heat to an industrial process that requires heating. Moreover, whether or not heat is required for a process, the combustion itself can produce products such as synthesis gases by means of partial oxidation of a fuel or other combustible substance occasioned as a result of the combustion.

Oxygen transport membranes can utilize a single phase mixed conducting material such as a perovskite to conduct the electrons and transport the oxygen ions. While perovskite materials can exhibit a high oxygen flux, such materials tend to be very fragile under operational conditions involved where a fuel or other combustible substance is used to produce the partial pressure difference. This is because the perovskite will have a variable stoichiometry with respect to oxygen. In air, it will have one value and in the presence of a fuel that is undergoing combustion it will have another value. The end result is that at the fuel side, the material will tend to expand relative to the air side and a dense layer will therefore, tend to fracture. In order to overcome this problem, a mixture of materials can be used in which a primarily ionic conductor is provided to conduct the oxygen ions and a primarily electronic conductor is used to conduct the electrons. The primarily ionic conductor can be a fluorite such as a stabilized zirconia and the primarily electronic conductor can be a perovskite. Where the primarily ionic conductor is a fluorite, this chemical expansion is less problematical.

Typically, oxygen transport membranes are composite, also known as supported thick film, structures that include a dense separation layer composed of the two phases of materials, a porous fuel oxidation layer located between the dense separation layer and a porous support layer and a porous surface activation layer located opposite to the porous fuel oxidation layer and on the other side of the dense separation layer. All of these layers are supported on a porous support, or porous supporting substrate. The dense separation layer is where the oxygen ion transport principally occurs. Although defects in the dense separation layer can occur that enable the passage of gas through such layer, it is intended to be gas tight and therefore, not porous. Both the porous surface activation layer and the porous fuel oxidation layers are "active", that is, they are formed from materials that permit the transport of oxygen ions and the conduction of electrons. Since the resistance to oxygen ion transport is dependent on the thickness of the membrane, the dense separation layer is made as thin as possible and therefore must be supported in any case. The porous fuel oxidation layer enhances the rate of fuel oxidation by providing a high surface area where fuel can react with oxygen or oxygen ions. The oxygen ions diffuse through the mixed conducting matrix of this porous layer towards the porous support and react with the fuel that diffuses inward from the porous support into the porous fuel oxidation layer. The porous surface activation layer enhances the rate of oxygen incorporation by enhancing the surface area of the dense separation layer while providing a path for the resulting oxygen ions to diffuse through the mixed conducting oxide phase to the dense separation layer and for oxygen molecules to diffuse through the open pore space to the dense separation layer. The surface activation layer therefore, reduces the loss of driving force in the oxygen incorporation process and thereby increases the achievable oxygen flux. Preferably, the porous fuel oxidation layer and the porous surface exchange layer are formed from the same electronic and ionic phases as the dense separation layer to provide a close thermal expansion match between the layers.

U.S. Pat. No. 7,556,676 describes a composite oxygen ion transport membrane. In order to form a dense, gas impermeable dual phase membrane layer from these materials the membrane needs to contain vanadium, and be sintered in a furnace atmosphere containing a mixture of hydrogen and nitrogen. From a cost perspective for high volume manufacturing it would be preferable to sinter in air. From an environmental viewpoint it would be beneficial to eliminate vanadium. The materials of both the porous intermediate fuel oxidation layer and the porous air side surface exchange layers described in this patent have shown a tendency to densify during prolonged usage at high temperatures. Densification of these layers results in degradation of oxygen flux through the membrane.

As will be discussed the present invention provides a method of manufacturing a composite oxygen ion transport membrane and the membrane structure resulting from such manufacture that among other advantages incorporates materials that enable fabrication to be accomplished in a more cost effective manner than in the prior art and also, will be more durable than prior art membranes.

SUMMARY OF THE INVENTION

The present invention provides a method of producing an oxygen ion composite membrane. In accordance with such method, a first layer is formed on a porous support containing a first mixture of particles of $(Ln_{1-x}A_x)_w Cr_{1-y}B_y O_{3-\delta}$ and doped zirconia and that does not contain or is substantially free of pore formers. Ln is La, Y, Pr, Ce or Sm, A is Ca, B is Fe, Mn, Co, Al, Ti or combinations thereof, w is 0.9-1.1, x is 0.1-0.4 and y is 0.1-0.6. The first mixture contains the $(Ln_{1-x}A_x)_w Cr_{1-y}B_y O_{3-\delta}$ and the doped zirconia such that when sintered, first layer will contain $(Ln_{1-x}A_x)_w Cr_{1-y}B_y O_{3-\delta}$ and the doped zirconia in a first volume ratio of between 2 to 3 and 4 to 1 on a volume percentile basis. A second layer is formed on the first layer that contains a second mixture of particles of $(Ln_{1-x}A_x)_w Cr_{1-y}B_y O_{3-\delta}$ and the doped zirconia and that does not contain or is substantially free of pore formers. In such mixture, Ln is La, Y, Pr, Ce or Sm, A is Sr, and B is Fe, Mn, Co, Al, Ti or combinations thereof, w is 0.9-1.1, x is 0.1-0.3 and y is 0.1-0.6. The second mixture contains the $(Ln_{1-x}A_x)_w Cr_{1-y}B_y O_{3-\delta}$ and the doped zirconia such that when sintered, second layer will contain the $(Ln_{1-x}A_x)_w Cr_{1-y}B_y O_{3-\delta}$ and the doped zirconia in a second volume ratio of between 1 to 4 and 3 to 2 on a volume percentile basis. The first layer and the second layer and porous support are heated so that said first layer partially sinters into a porous mass containing the first mixture of particles, thereby to provide a porous fuel oxidation layer and the second layer fully sinters into a densified mass containing the second mixture of particles, thereby to provide a dense separation layer.

As can be appreciated from the above discussion, since the composite membrane of the present invention is directly formed by sintering the layers in air, special sintering atmospheres do not have to be utilized. Furthermore, the porous layers do not use or is substantially free of pore formers. Both of these factors help to reduce the costs involved in fabricating such a composite membrane of the present invention. It is to be noted here that the production of a porous structure without the use of pore formers is a particularly unexpected result. In this regard, if $(Ln_{1-x}Ca_x)_w Cr_{1-y}B_y O_{3-\delta}$ is heated alone, it will sinter into a dense mass and will not be porous. The same will occur if a doped zirconia is sintered. However, if these materials are mixed together and then heated, a porous mass will result. Since such porous structure does not depend on pore formers and is formed at a temperature significantly higher than the membrane operation temperature during use, the pores will be less likely to close over time and therefore, the durability and life of the membrane will increase over prior art membranes. Furthermore, among other advantages of the present invention, Vanadium is not used and since all layers incorporate similar $ABO_3$ materials, there will be a close thermal expansion match between layers.

In addition to the foregoing, a third layer can be formed on the second layer containing a third mixture of particles of $(Ln_{1-x}A_x)_w Cr_{1-y}B_y O_{3-\delta}$ and the doped zirconia and that does not contain or is substantially free of pore formers. Again, for such mixture, Ln is La, Y, Pr, Ce or Sm, A is Ca, B is Fe, Mn, Co, Al, Ti or combinations thereof, w is 0.9-1.1, x is 0.1-0.4 and y is 0.1-0.6. The third mixture has a third volume ratio of the $(Ln_{1-x}A_x)_w Cr_{1-y}B_y O_{3-\delta}$ and the doped zirconia such that, when sintered, the third layer will contain the $(Ln_{1-x}A_x)_w Cr_{1-y}B_y O_{3-\delta}$ and the doped zirconia in a third volume ratio of between 1 to 3 and 3 to 1 on a volume percentile basis. The third layer is sintered in air at a temperature of >1300° C. such that the third layer is porous. Furthermore, the first mixture can also contain particles of $Ce_{1-x}A_x O_2$ where A is Gd, Sm, Y, La, Nb, Zr and x is 0.1-0.4. The purpose of such particles is to catalyze the oxidation of a fuel introduced into the porous support. Preferably, the doped zirconia is 10 mol % Scandia 1 mol % Yttria doped Zirconia (10Sc1YSZ).

The $(Ln_{1-x}A_x)_w Cr_{1-y}B_y O_{3-\delta}$ within the first mixture of particles and the third mixture of particles can be $(La_{1-x}Ca_x)_w Cr_{1-y}Mn_y O_{3-\delta}$, where x is 0.2 and y is 0.5. The $(Ln_{1-x}A_x)_w Cr_{1-y}B_y O_{3-\delta}$ and 10Sc1YSZ within the second mixture of particles can be $(La_{1-x}Sr_x)_w Cr_{1-y}Fe_y O_{3-\delta}$, where x is 0.2 and y is 0.5. Moreover, the sintered porous support is formed from a stabilized zirconia or a mixture of MgO and $MgAl_2O_4$.

Preferably, the first volume ratio is 3 to 2, the second volume ratio is 2 to 3 and the third volume ratio is 1 to 1. The porous support can be of tubular configuration. In a specific embodiment, the porous support is formed of 3 mol % Yttria Stabilized Zirconia (3YSZ) and fired at a temperature of 1000° C. so that it is not fully sintered prior to forming the first layer on the porous support. In such embodiment, the first layer, after having been formed on the porous support, is fired at a temperature of 950° C. to remove binder from the first mixture. The second layer is then formed on the first layer. The first layer, the second layer and the porous support are then sintered at a temperature of 1400° C. Additionally, the third layer can be sintered at a temperature of between 1300° C. and 1400° C. Alternatively, the first layer, the second layer and the third layer are sintered at a temperature of 1400° C. It is also possible that the substrate can be fully sintered such that it will have no further shrinkage prior to application of the subsequent layers. In this example the subsequent layers are formulated such that the second layer will fully densify through a process of constrained sintering. In any embodiment of the present invention, the first layer, the second layer and the third layer are formed by slurry coating.

In yet another aspect, the present invention provides a method of producing a porous material. In such aspect, a first mixture of particles of $(Ln_{1-x}A_x)_w Cr_{1-y}B_y O_{3-\delta}$ and doped zirconia and that does not contain or is substantially free of pore formers is provided. Ln is La, Y, Pr, Ce or Sm, A is Ca, B is Fe, Mn, Co, Al, Ti, or combinations thereof, w is 0.9-1.1, x is 0.1-0.4 and y is 0.1-0.6. The first mixture has a first volume ratio of the $(Ln_{1-x}A_x)_w Cr_{1-y}B_y O_{3-\delta}$ and the doped zirconia such that when sintered, the first layer will contain the $(Ln_{1-x}A_x)_w Cr_{1-y}B_y O_{3-\delta}$ and the doped zirconia in a first volume ratio of between 2 to 3 and 4 to 1 on a volume percentile basis. The mixture is sintered in air at a temperature of >1300° C. to form the porous material. Preferably, the doped zirconia is 10 mol % Scandia 1 mol % Yttria doped Zirconia. Such a porous material can have a wider use than in composite oxygen ion transport membranes where robust supporting structures are required.

The present invention also provides an oxygen ion composite membrane that comprises first and second layers on a porous support providing a porous fuel oxidation layer and a dense separation layer, respectively. Each of the first and second layers contain a mixture of $(Ln_{1-x}A_x)_w Cr_{1-y}B_y O_{3-\delta}$ and doped zirconia, where for the first of the layers, Ln is La, Y, Pr, Ce or Sm, A is Ca, B is Fe, Mn, Co, Al, Ti or combinations thereof, w is 0.9-1.1, x is 0.1-0.4 and y is 0.1-0.6 and for the second of the layers, Ln is La, Y, Pr, Ce or Sm, A is Sr, and B is Fe, Mn, Co, Al, Ti or combinations thereof, w is 0.9-1.1, x is 0.1-0.3 and y is 0.1-0.6. The first of the layers contains the $(Ln_{1-x}A_x)_w Cr_{1-y}B_y O_{3-\delta}$ and the doped zirconia in a first volume ratio of between 2 to 3 and 4 to 1 on a volume percentile basis. The second of the layers contains the $(Ln_{1-x}A_x)_w Cr_{1-y}B_y O_{3-\delta}$ and the doped zirconia in a second volume ratio of between 1 to 4 and 3 to 2 on a volume percentile basis.

A third layer can be situated on the second layer to form a porous surface exchange layer and that also contains the mixture of $(Ln_{1-x}A_x)_wCr_{1-y}B_yO_{3-\delta}$ and the doped zirconia. In such layer, Ln is La, Y, Pr, Ce or Sm, A is Ca, B is Fe, Mn, Co, Al, or combinations thereof, w is 0.9-1.1, x is 0.1-0.4 and y is 0.1-0.6. The third layer contains the $(Ln_{1-x}A_x)_wCr_{1-y}B_yO_{3-\delta}$ and the doped zirconia in a third volume ratio of between 1 to 3 and 3 to 1 on a volume percentile basis.

The first layer can also contain particles of $Ce_{1-x}A_xO_2$ where A is Gd or Sm and x is 0.1-0.4. Further, the doped zirconia can be 10Sc1YSZ. Preferably, the $(Ln_{1-x}A_x)_wCr_{1-y}B_yO_{3-\delta}$ within the first layer and the third layer is $(La_{1-x}Ca_x)_wCr_{1-y}Mn_yO_{3-\delta}$, where x is 0.2 and y is 0.5. The $(La_{1-x}A_x)_wCr_{1-y}B_yO_{3-\delta}$ within the second layer is preferably $(La_{1-x}Sr_x)_wCr_{1-y}Fe_yO_{3-\delta}$, where x is 0.2 and y is 0.5; and the sintered porous support is preferably formed from stabilized zirconia or a mixture of MgO and $MgAl_2O_4$. Additionally, preferably, the first volume ratio is 3 to 2, the second volume ratio is 2 to 3 and the third volume ratio is 1 to 1. In any embodiment of the present invention and in any aspect, the porous support is of tubular configuration.

BRIEF DESCRIPTION OF THE DRAWINGS

While the specification concludes with claims distinctly pointing out the subject matter that Applicants regard as their invention, it is believed that the invention will be better understood when taking in connection with the accompanying drawings in which the sole FIGURE is a cross-sectional schematic illustration of a composite oxygen ion transport membrane.

DETAILED DESCRIPTION

With reference to the FIGURE, a sectional, schematic view of a composite oxygen transport membrane 1 is illustrated. Composite oxygen transport membrane 1 has a porous support layer 10. Applied to the porous support layer 10 is a first layer 12, a second layer 14 and a third layer 16. The composite oxygen transport membrane is specifically designed to function in an environment in which a fuel or other combustible substance is introduced to the porous support layer 10, on the side opposite to the first, second and third layer 12, 14 and 16, and subjected to combustion supported by permeated oxygen to both provide the partial pressure difference necessary to drive oxygen ion transport and also to heat the membrane to an operational temperature at which oxygen ion transport will occur. As such, the first layer 12, which, as will be discussed, may optionally include a combustion catalyst, serves as a porous fuel oxidation layer at which combustion of the fuel or other combustible substance is promoted with the catalyst. In this regard, the term "fuel" when used in connection with this layer, both herein and in the claims, is not intended to be limiting, but rather, to indicate and include any substance that can be oxidized through permeation of oxygen through the membrane. The second layer 14 is the active layer at which oxygen ion transport principally occurs and as such, serves as dense separation layer that is impervious to gas, but allows oxygen ion transport. The third layer 16 serves to initially reduce the oxygen and thus serves as a porous surface activation layer. Each of the first layer 12, the second layer 14 and the third layer 16 after heating and sintering will preferably each have a thickness of 20 μm+/−10 μm.

The porous support layer 10 could be formed from partially stabilized zirconia oxide e.g. 3, 4 or 5 mol % yttria stabilized zirconia or fully stabilized zirconia e.g. 15 mol % calcia stabilized zirconia. Alternatively the porous substrate can be formed from a mixture of MgO and $MgAl_2O_4$. Alternatively the porous substrate could be a porous metal. In this regard, although not part of the present invention, as would be appreciated by those skilled in the art, porous support layer 10 should provide as open an area as possible while still being able to be structurally sound in its supporting function. Porous support structures for application in composite oxygen transport membranes are best characterized in terms of their porosity, strength and effective oxygen diffusivity. The porous support forms the mechanical support for the "active" membranes layers so should have sufficient strength at high temperatures. A typical support structure in this application would have total porosity in the range 20-50%. An important property of the porous substrate is the ability to allow gaseous species to readily move through the porous support structure to and from the membrane 'active' layers e.g. $H_2$, CO, $H_2O$ and CO2. The ability of the substrate to allow gaseous transport can be characterized as an effective oxygen diffusivity, $D_{\mathit{eff}\,O2\text{-}N2}$. For this application it has been determined that a $D_{\mathit{eff}\,O2\text{-}N2}$ more than 0.005 $cm^2$/s measured at room temperature is preferred. The porous substrate should also possess a thermal expansion coefficient not more than 10% different from that of the membrane 'active' layers between room temperature and membrane operation temperature.

A stabilized zirconia, namely, $Zr_{1-x-y}A_xB_yO_{2-\delta}$ is a common material in all three "active" membrane layers, namely, the first layer 12, the second layer 14 and the third layer 16. As mentioned above in all of these layers oxygen ion transport occurs and as such, are "active". In order to generate industrially relevant levels of oxygen ion conductivity, A and B are typically Sc, Y, Ce, Al or Ca. Preferably, such stabilized zirconia has a composition given by formula: $Zr_{0.802}Sc_{0.180}Y_{0.018}O_{2-\delta}$, often noted as 10Sc1YSZ in literature associated with this class of membrane. However it should be noted that many different combinations of Sc, Y, Ce, Al, Ca or other elements can be substituted to achieve the same end.

Turning first to the first layer 12, this layer is formed from a first mixture of particles of $(Ln_{1-x}A_x)_wCr_{1-y}B_yO_{3-\delta}$ and 10Sc1YSZ and that does not contain or is substantially free of pore formers. In this layer, Ln is La, Y, Pr, Ce or Sm, A is Ca, B can be Mn, Fe, Co Al, Ti or combinations thereof; w is 0.9 to 1.1, x is 0.1-0.4 and y is 0.1-0.6. The preferred composition of material for this layer is $(La_{0.8}Ca_{0.2})_{0.95}Cr_{0.5}Mn_{0.5}O_{3-\delta}$. The $(La_{1-x}A_x)_wCr_{1-y}B_yO_{3-\delta}$ and 10Sc1YSZ should be present within a first volume ratio of between 2 to 3 and 4 to 1 on a volume percentage basis after the first layer 12 has been sintered. The preferred first volume ratio is 3 to 2.

If either of these materials $(Ln_{1-x}Ca_x)_wCr_{1-y}B_yO_{3-\delta}$ or 10Sc1YSZ is sintered in air, they will both sinter to a high density. The $(Ln_{1-x}Ca_x)_wCr_{1-y}B_yO_{3-\delta}$ will sinter to a high density in air due to a liquid phase sintering mechanism involving precipitation of $CaCrO_4$. In fact, the preferred composition, $(La_{0.8}Ca_{0.2})_{0.95}Cr_{0.5}Mn_{0.5}O_{3-\delta}$ sinters readily to full density at temperatures of 1350-1400° C. in air, as do many other such materials where A is Ca and w is 0.9-1.1. As a single phase material, 10Sc1YSZ also sinters readily to full density at temperatures of 1400° C. in air. It should therefore be expected that when mixing both these materials together that the mixture would also readily densify in air at temperatures approaching 1400° C. However, it has been found when these two materials are mixed, quite unexpectedly, the combination of the two materials had very poor sintering characteristics and remained substantially porous (>30% porosity) after sintering at 1400° C. in air. This is quite surprising and allows the composite oxygen ion transport membrane to be sintered in a very much simplified manner in connection with the traditional processing that required pore formers. As mentioned above, one of the key functions of the intermediate porous fuel oxidation layer is that it needs to remain porous for years of operation in order that the membrane does not degrade in oxygen flux performance. This layer, where the fuel is oxidized, will see some of the highest temperatures in the membrane. The fact that this combination of materials does not densify at temperatures of up to 1400° C. in air make them excellent candidates for the fuel oxidation layer which needs to remain porous for tens of thousands of hours at 1000° C. Moreover, as indicated above, the combination of such materials can have other applications beyond composite oxygen ion transport membranes. For example, such a structure could be used in a catalyst support.

As mentioned above a catalyst can be present within the first layer 12. In this regard, first layer 12 can contain particles of $Ce_{1-x}A_xO_2$ where A is Gd or Sm, Y, La, Zr. These particles can be added to the first mixture before the layer is formed or impregnated as a solution after forming the layer. Such catalyst would be used where it is desirable to promote combustion of such combustible substances as natural gas or synthesis gas.

The second layer 14 is formed of a second mixture of particles of $(Ln_{1-x}A_x)_wCr_{1-y}B_yO_{3-\delta}$ and 10Sc1YSZ. The function of the second layer 14 is to be a gas separation layer that is impervious to gas molecules but should is conductive to oxygen ions and electrons. There are other materials that could serve such a purpose. However, for the $(Ln_{1-x}A_x)_wCr_{1-y}B_yO_{3-\delta}$ component, Ln is preferably La, A is preferably Sr, B is preferably Fe, x is 0.1-0.3 and y is 0.1-0.6 and w is 0.9-1.1. The preferred composition of material for this layer is $(La_{0.8}Sr_{0.2})_{0.95}Cr_{0.5}Fe_{0.5}O_{3-\delta}$ Unlike the first layer 12, however, A cannot be calcium in that as also discussed above, such a material will be porous upon sintering. Although this composition is very similar to that of the material selected for both the first layer 12 and the third layer to be discussed, differing only in composition in that in place of Ca, Sr is used, the sintering and densification properties are markedly different. This layer will sinter dense at 1400° C. in air. Within the second mixture of particles, the $(Ln_{1-x}A_x)_wCr_{1-y}B_yO_{3-\delta}$ and 10Sc1YSZ should be present within a second volume ratio of between 1 to 4 and 3 to 2 on a volume percentage basis after the first layer 12 has been sintered. The preferred second volume ratio is about 2 to 3.

The third layer 16, that serves as the porous surface exchange layer is formed of a third mixture of particles of $(Ln_{1-x}A_x)_wCr_{1-y}B_yO_{3-\delta}$ and 10Sc1YSZ. In this layer, Ln is La, Y, Pr, Ce or Sm, A is Ca or Sr but preferably Ca, B can be Mn, Fe, Co Al, Ti or combinations thereof; w is 0.9-1.1, x is 0.1-0.4 and y is 0.1-0.6. The preferred composition of material for this layer is currently the same as that deployed in the first layer 12, namely, $(La_{0.8}Ca_{0.2})_{0.95}Cr_{0.5}Mn_{0.5}O_{3-\delta}$. This material is preferred for the same reasons as in the first layer 12 (i.e.) it will not sinter dense in air at temperatures of up to 1400° C. when mixed with 10Sc1YSZ or other zirconia based compositions. The $(Ln_{1-x}A_x)_wCr_{1-y}B_yO_{3-\delta}$ and 10Sc1YSZ should be present within a third volume ratio of between 1 to 3 and 3 to 1 on a volume percentage basis after the first layer 12 has been sintered. The preferred third volume ratio is about 1 to 1.

As an example of forming the composite oxygen ion transport membrane 1, the $(La_{0.8}Sr_{0.2})_{0.95}Cr_{0.5}Fe_{0.5}O_{3-\delta}$ for the second layer can be obtained from NexTech Materials, Ltd., Lewis Center, Ohio and $Zr_{0.802}Sc_{0.180}Y_{0.018}O_{2-\delta}$ can be obtained from Daiichi Kigenso Kagaku Kogyo Co., Ltd, Osaka, Japan through their US agent Sojitz, Ltd, in New York, USA. The perovskite phase $(La_{0.8}Sr_{0.2})_{0.95}Cr_{0.5}Fe_{0.5}O_{3-\delta}$ can have a particle size D50 in the range 0.3-0.35 μm, the $Zr_{0.802}Sc_{0.180}Y_{0.018}O_{2-\delta}$ should have a D50 of <0.6 μm. To fabricate a 120 gram batch of dense gas separation layer slurry, 51 g of $(La_{0.8}Sr_{0.2})_{0.95}Cr_{0.5}Fe_{0.5}O_{3-\delta}$ is mixed with 69 g of $Zr_{0.802}Sc_{0.180}Y_{0.018}O_{2-\delta}$, 60 g Ferro B73210 binder, 255 g Toluene and 1200 g of 1.5 mm diameter YSZ milling media in a 32 oz NALGENE bottle. The mixture is milled for about 2.25 hours or until the particle size of the mixture is in the range 0.3-0.35 μm. The material for first layer 12, $(La_{0.8}Ca_{0.2})_{0.95}Cr_{0.5}Mn_{0.5}O_{3-\delta}$, is also obtained from NexTech Materials, Ltd., Lewis Center, Ohio and $Zr_{0.802}Sc_{0.180}Y_{0.018}O_{2-\delta}$ can also be obtained from Daiichi Kigenso Kagaku Kogyo Co. Ltd, Osaka, Japan through their US agent Sojitz, Ltd, in New York. The perovskite phase $(La_{0.8}Ca_{0.2})_{0.95}Cr_{0.5}Mn_{0.5}O_{3-\delta}$ is specified as having a particle size D50 in the range 0.3-0.35 μm, the $Zr_{0.802}Sc_{0.180}Y_{0.018}O_{2-\delta}$ should have a D50 of <0.6 μm as received. In order to fabricate a 120 g batch of dense gas separation layer slurry, 75 g of $(La_{0.8}Ca_{0.2})_{0.95}Cr_{0.5}Mn_{0.5}O_{3-\delta}$ is mixed with 45 g of $Zr_{0.802}Sc_{0.180}Y_{0.018}O_{2-\delta}$, 60 g Ferro B73210 binder, 255 g Toluene and 1200 g of 1.5 mm diameter YSZ milling media in a 32 oz Nalgene bottle. The mixture is milled for about 2.25 hours or until the particle size of the mixture is in the range 0.3-0.35 μm. Additionally a small amount of e.g. $Ce_{0.9}Gd_{0.1}O_{1.95}$ oxidation catalyst can be added as a powder to the mixture during fabrication of this slurry. The third layer 16 can be formed in exactly the same manner as the first layer 12.

In order to form a composite oxygen transport membrane 1 from these two slurries the slurries are deposited on a porous support 10 by slurry coating followed by firing in air. The porous support 10 can be of tubular architecture and fabricated by an extrusion process. Although the porous support 10 can be fully sintered, it can first be fired at a low temperature (e.g.) 1000° C. after green forming such that some residual shrinkage remains when the coated substrate is fired again at higher temperatures. The second layer 12 is then deposited on the surface of the porous support layer 10 and the thickness is controlled by the speed at which the supporting substrate is dipped into the slurry. The second layer 12 is allowed to dry and can be optionally fired at a temperature of 950° C. in air to remove the binder. The second layer 14 is then applied on top of the first layer 12 by dipping the component into the slurry formed for such layer and allowed to dry. The three layers are then fired together at a higher temperature of 1400° C. in air. After this, the third layer 16 is applied by slurry coating the sintered three layer membrane structure and firing at a temperature of >1300° C. in air. The third layer 16 could also be applied after drying of the dense layer, 14 and then co-firing all three active layers 12, 14, 16 together in one high temperature sintering step at >1300° C. in air. Combining the high temperature sintering steps for these three layers leads to lower manufacturing costs than can be achieved when using separate high temperature sintering steps for each of the three layers.

While the present invention has been described with reference to a preferred embodiment, as would occur to those skilled in the art, numerous changes, additions and omission may be made without departing from the spirit and scope of the present invention as set forth in the appended claims.

The invention claimed is:

1. A method of producing an oxygen ion composite membrane comprising:
    forming a first layer on a porous support containing a first mixture of particles of $(Ln_{1-x}A_x)_wCr_{1-y}B_yO_{3-\delta}$ and doped zirconia and substantially free of pore formers, where Ln is La, Y, Pr, Ce or Sm; A is Ca, B is Fe, Mn, Co, Al, Ti or combinations thereof; w is 0.9-1.1; x is 0.1-0.4 and y is 0.1-0.6;

forming a second layer on the first layer that contains a second mixture of particles of $(Ln_{1-x}A_x)_w Cr_{1-y}B_y O_{3-\delta}$ and the doped zirconia, where Ln is La, Y, Pr, Ce or Sm; A is Sr; and B is Fe, Mn, Co, Al, Ti or combinations thereof; w is 0.9-1.1; x is 0.1-0.3 and y is 0.1-0.6; and heating the first layer, the second layer and the porous support so that said first layer partially sinters into a porous mass containing the first mixture of particles, thereby to provide a porous fuel oxidation layer and the second layer fully sinters into a densified mass containing the second mixture of particles, thereby to provide a dense separation layer;

wherein the partially sintered first layer contains $(Ln_{1-x}A_x)_w Cr_{1-y}B_y O_{3-\delta}$ and doped zirconia in a first volume ratio of between 2 to 3 and 4 to 1 on a volume percentile basis; and wherein the sintered second layer contains $(Ln_{1-x}A_x)_w Cr_{1-y}B_y O_{3-\delta}$ and doped zirconia in a second volume ratio of between 1 to 4 and 3 to 2 on a volume percentile basis.

2. The method of claim 1, further comprising the steps of:

forming a third layer on the second layer containing a third mixture of particles of $(Ln_{1-x}A_x)_w Cr_{1-y}B_y O_{3-\delta}$ and doped zirconia and substantially free of pore formers, where Ln is La, Y, Pr, Ce or Sm; A is Ca; B is Fe, Mn, Co, Al, Ti or combinations thereof; w is <0.9-1.1; x is 0.1-0.4 and y is 0.1-0.6;

heating the third layer so that said third layer partially sinters into a porous mass containing the third mixture of particles, thereby to provide a porous surface exchange layer;

wherein the partially sintered third layer contains $(Ln_{1-x}A_x)_w Cr_{1-y}B_y O_{3-\delta}$ and doped zirconia in a third volume ratio of between 1 to 3 and 3 to 1 on a volume percentile basis.

3. The method of claim 2, wherein the first mixture also contains particles of $Ce_{1-x}A_x O_2$ where A is Gd or Sm; and x is 0.1-0.4.

4. The method of claim 3, wherein the doped zirconia is 10Sc1YSZ.

5. The method of claim 1, wherein:

the $(Ln_{1-x}A_x)_w Cr_{1-y}B_y O_{3-\delta}$ within the first mixture of particles and the third mixture of particles is $(La_{1-x}Ca_x)_w Cr_{1-y}Mn_y O_{3-\delta}$, where x is 0.2 and y is 0.5;

the $(Ln_{1-x}A_x)_w Cr_{1-y}B_y O_{3-\delta}$ and 10Sc1YSZ within the second mixture of particles is $(La_{1-x}Sr_x)_w Cr_{1-y}Fe_y O_{3-\delta}$, where x is 0.2 and y is 0.5; and the sintered porous support is formed from doped zirconium oxide or a mixture of MgO and $MgAl_2O_4$.

6. The method of claim 2, wherein the first volume ratio is 3 to 2, the second volume ratio is 2 to 3 and the third volume ratio is 1 to 1.

7. The method of claim 2, wherein the porous support is of tubular configuration.

8. The method of claim 7, wherein:

the porous support is formed of 3YSZ and fired at a temperature of 1000° C. so that it is not fully sintered prior to forming the first layer on the porous support;

the first layer after having been formed on the porous support is fired at a temperature of 950° C. to remove binder from the first mixture; and the first layer, the second layer and the porous support are sintered at a temperature of 1400° C.

9. The method of claim 8, wherein the third layer is sintered at a temperature of between 1300° C. and 1400° C.

10. The method of claim 7, wherein the first layer, the second layer and the third layer are sintered at a temperature of 1400° C.

11. The method of claim 2, wherein the first layer, the second layer and the third layer are formed by slurry coating.

12. A method of producing a porous material comprising:

forming a mixture of particles of $(Ln_{1-x}A_x)_w Cr_{1-y}B_y O_{3-\delta}$ and doped zirconia and that is substantially free of pore formers, where Ln is La, Y, Pr, Ce or Sm; A is Ca; B is Fe, Mn, Co, Al, Ti or combinations thereof; w is <0.9-1.1; x is 0.2-0.4 and y is 0.1-0.6; and sintering the first mixture in air at a temperature of <1300° C.;

wherein the sintered first mixture contains $(Ln_{1-x}A_x)_w Cr_{1-y}B_y O_{3-\delta}$ and doped zirconia in a first volume ratio of between 1 to 4 and 4 to 1 on a volume percentile basis.

13. The method of claim 12, wherein the doped zirconia is 10Sc1YSZ.

14. An oxygen ion composite membrane comprising:

first and second layers on a porous support providing a porous fuel oxidation layer and a dense separation layer, respectively, for the oxygen ion composite membrane;

each of the first and second layers containing a mixture of $(Ln_{1-x}A_x)_w Cr_{1-y}B_y O_{3-\delta}$ and doped zirconia, where for the first of the layers, Ln is La, Y, Pr, Ce or Sm; A is Ca; B is Fe, Mn, Co, Al, Ti or combinations thereof; w is <0.9-1.1; x is 0.1-0.4; and y is 0.1-0.6 and for the second of the layers, A is Sr; and B is Fe, Mn, Co, Al or combinations thereof; w is <0.9-1.1; x is 0.1-0.3; and y is 0.1-0.6;

the first of the layers containing $(Ln_{1-x}A_x)_w Cr_{1-y}B_y O_{3-\delta}$ and doped zirconia in a first volume ratio of between 2 to 3 and 4 to 2 on a volume percentile basis; and the second of the layers containing $(Ln_{1-x}A_x)_w Cr_{1-y}B_y O_{3-\delta}$ and doped zirconia in a second volume ratio of between 1 to 4 and 3 to 2 on a volume percentile basis.

15. The oxygen ion composite membrane of claim 14, wherein:

a third layer is situated on the second layer to form a porous surface exchange layer and that also contains the mixture of $(Ln_{1-x}A_x)_w Cr_{1-y}B_y O_{3-\delta}$ and the doped zirconia, where Ln is La, Y, Pr, Ce or Sm; A is Ca; B is Fe, Mn, Co, Al, Ti or combinations thereof; w is <0.9-1.1; x is 0.1-0.4; and y is 0.1-0.6; and the third layer containing $(Ln_{1-x}A_x)_w Cr_{1-y}B_y O_{3-\delta}$ and doped zirconia in a third volume ratio of between 1 to 3 and 3 to 1 on a volume percentile basis.

16. The oxygen ion composite membrane of claim 15, wherein the first mixture also contains particles of $Ce_{1-x}A_x O_2$ where A is Gd or Sm and x is 0.1-0.4.

17. The oxygen ion composite membrane of claim 16, wherein the doped zirconia is 10Sc1YSZ.

18. The oxygen ion composite membrane of claim 17, wherein:

the $(Ln_{1-x}A_x)_w Cr_{1-y}B_y O_{3-\delta}$ within the first layer and the third layer is $(La_{1-x}Ca_x)_w Cr_{1-y}Mn_y O_{3-\delta}$, where x is 0.2 and y is 0.5;

the $(Ln_{1-x}A_x)_w Cr_{1-y}B_y O_{3-\delta}$ within the second layer is $(La_{1-x}Sr_x)_w Cr_{1-y}Fe_y O_{3-\delta}$, where x is 0.2 and y is 0.5; and the sintered porous support is formed from stabilized zirconia oxide or a mixture of MgO and $MgAl_2O_4$.

19. The oxygen ion composite membrane of claim 15, wherein the porous support is of a tubular configuration and wherein the first volume ratio is 3 to 2, the second volume ratio is 2 to 3 and the third volume ratio is 1 to 1.

* * * * *